(12) United States Patent
Sullivan et al.

(10) Patent No.: US 7,925,727 B2
(45) Date of Patent: Apr. 12, 2011

(54) METHOD AND APPARATUS FOR EFFICIENT COMMUNICATION OF MANAGEMENT DATA IN A TELECOMMUNICATIONS NETWORK

(75) Inventors: Patrick Sullivan, Ottawa (CA); Peter Bujold, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1287 days.

(21) Appl. No.: 10/901,081

(22) Filed: Jul. 29, 2004

(65) Prior Publication Data

US 2006/0026272 A1 Feb. 2, 2006

(51) Int. Cl.
G06F 7/04 (2006.01)
G06F 15/173 (2006.01)
H04L 29/06 (2006.01)

(52) U.S. Cl. ............ 709/223; 709/224; 709/225; 726/3; 726/7

(58) Field of Classification Search .................. 709/223, 709/224, 225; 726/3, 7
See application file for complete search history.

(56) References Cited

U.S. PATENT DOCUMENTS

| | | | | |
|---|---|---|---|---|
| 5,031,089 A * | 7/1991 | Liu et al. | ...................... | 709/226 |
| 5,261,044 A * | 11/1993 | Dev et al. | ...................... | 715/855 |
| 5,276,440 A * | 1/1994 | Jolissaint et al. | ........ | 340/825.02 |
| 5,285,494 A * | 2/1994 | Sprecher et al. | .............. | 455/423 |
| 5,475,817 A * | 12/1995 | Waldo et al. | .................. | 719/316 |
| 5,548,722 A * | 8/1996 | Jalalian et al. | ................. | 709/220 |
| 5,689,711 A * | 11/1997 | Bardasz et al. | ............... | 717/105 |
| 5,758,083 A * | 5/1998 | Singh et al. | .................... | 709/223 |
| 5,802,320 A * | 9/1998 | Baehr et al. | ................... | 709/249 |
| 5,809,230 A * | 9/1998 | Pereira | ............................ | 726/35 |
| 5,828,830 A * | 10/1998 | Rangaraian et al. | ............ | 714/48 |
| 5,918,015 A * | 6/1999 | Suzuki et al. | .................. | 709/219 |
| 5,968,121 A * | 10/1999 | Logan et al. | ................... | 709/219 |
| 6,243,746 B1 * | 6/2001 | Sondur et al. | .................. | 709/220 |
| 6,253,243 B1 | 6/2001 | Spencer | ......................... | 709/224 |
| 6,255,943 B1 * | 7/2001 | Lewis et al. | .................... | 340/506 |
| 6,260,062 B1 * | 7/2001 | Davis et al. | .................... | 709/223 |
| 6,272,540 B1 * | 8/2001 | Yadav et al. | ................... | 709/223 |
| 6,286,038 B1 * | 9/2001 | Reichmeyer et al. | ......... | 709/220 |
| 6,330,598 B1 * | 12/2001 | Beckwith et al. | ............. | 709/223 |
| 6,349,333 B1 * | 2/2002 | Panikatt et al. | ............... | 709/223 |
| 6,363,421 B2 * | 3/2002 | Barker et al. | .................. | 709/223 |
| 6,363,477 B1 * | 3/2002 | Fletcher et al. | ............... | 713/151 |

(Continued)

OTHER PUBLICATIONS

"An Integrated Service Management Architecture for Assuring SLA in Multi-layer Networks"; Sep. 13, 2000; Choong Seon Hong and EunChul Kim.

(Continued)

*Primary Examiner* — Joon H Hwang
*Assistant Examiner* — Daniel C Murray
(74) *Attorney, Agent, or Firm* — Ogilvy Renault LLP

(57) ABSTRACT

A mediator for efficiently exchanging management data in a hierarchical management network for managing network elements of a data transport network partitions resources of the network elements among a plurality of management representations of the network elements and selectively forwards management data associated with respective management representations to a higher level of the hierarchy. The mediator modifies the management data so that the higher level (i.e. a northbound element management system or a network management system) receives the management data in a view consistent with the management representation of the network element. Client-based management representations may be created to permit clients to manage selected resources of a network element, and testing-based management representations may be created to facilitate concurrent testing of a network element.

18 Claims, 6 Drawing Sheets

U.S. PATENT DOCUMENTS

| | | | |
|---|---|---|---|
| 6,512,824 B1* | 1/2003 | Hsieh et al. | 379/230 |
| 6,603,396 B2* | 8/2003 | Lewis et al. | 340/506 |
| 6,718,377 B1* | 4/2004 | Bischoff et al. | 709/223 |
| 6,799,211 B1* | 9/2004 | Bennett et al. | 709/224 |
| 6,907,395 B1* | 6/2005 | Hunt et al. | 703/21 |
| 7,136,489 B1* | 11/2006 | Madhusudhana et al. | 380/277 |
| 7,185,075 B1* | 2/2007 | Mishra et al. | 709/223 |
| 7,243,374 B2* | 7/2007 | Howard et al. | 726/25 |
| 7,254,627 B2* | 8/2007 | Hain | 709/223 |
| 7,315,893 B2* | 1/2008 | Vinberg | 709/224 |
| 7,367,029 B2* | 4/2008 | Edwards et al. | 719/315 |
| 7,376,898 B1* | 5/2008 | Yehuda et al. | 715/741 |
| 7,395,320 B2* | 7/2008 | Hunt et al. | 709/220 |
| 7,415,003 B1* | 8/2008 | Ogura et al. | 370/351 |
| 7,471,629 B2* | 12/2008 | Melpignano | 370/232 |
| 7,496,950 B2* | 2/2009 | Carley | 726/3 |
| 7,502,898 B2* | 3/2009 | Blumenau et al. | 711/152 |
| 7,558,847 B2* | 7/2009 | Strassner | 709/223 |
| 2001/0020254 A1* | 9/2001 | Blumenau et al. | 709/229 |
| 2001/0037390 A1* | 11/2001 | Kuroyanagi | 709/225 |
| 2001/0052006 A1* | 12/2001 | Barker et al. | 709/223 |
| 2002/0004828 A1* | 1/2002 | Davis et al. | 709/223 |
| 2002/0184527 A1* | 12/2002 | Chun et al. | 713/201 |
| 2003/0101251 A1* | 5/2003 | Low | 709/223 |
| 2003/0208351 A1* | 11/2003 | Hartman et al. | 703/22 |
| 2004/0064704 A1* | 4/2004 | Rahman | 713/182 |
| 2005/0015478 A1* | 1/2005 | Canali et al. | 709/223 |
| 2006/0109800 A1* | 5/2006 | Vaillant et al. | 709/223 |
| 2007/0006325 A1* | 1/2007 | Gargaro | 726/27 |
| 2008/0256237 A1* | 10/2008 | Liu | 709/226 |
| 2008/0307514 A1* | 12/2008 | Kusakari | 726/7 |
| 2009/0204697 A1* | 8/2009 | Jaladanki et al. | 709/223 |

OTHER PUBLICATIONS

TMF-814 Agent Adapter: Enabling Faster & Accurate Standards Based, Northbound Interface Implementation; QCOM, Inc. pp. 2 and 3.

NetworkWorldFusion "Cosine beefs up its Customer Network Management software" by Tim Greene, Network World, Apr. 19, 2004.

IEC: Element Management Systems (EMSs) "International Engineering Consortiun Catalyzing progress in the information-industry and university communities" pp. 1 and 7.

* cited by examiner

METHOD AND APPARATUS FOR EFFICIENT COMMUNICATION OF MANAGEMENT DATA IN A TELECOMMUNICATIONS NETWORK

CROSS-REFERENCE TO RELATED APPLICATIONS

This is the first application filed for the present invention.

MICROFICHE APPENDIX

Not Applicable.

TECHNICAL FIELD

The present invention relates in general to hierarchical management networks for managing data transport networks and, in particular, to the efficient communication of management data within such networks by a mediator that provides multiple representations of managed network elements to network management systems.

BACKGROUND OF THE INVENTION

Today's telecommunications network elements (NEs) include high capacity cross-connects and switches that are interconnected, provisioned and tested to form highly complex network configurations. Specific ports of NEs may be reserved for different uses. For example, respective ports may provide dedicated or preferential service to one user.

There is an on-going effort in the art of network management to provide for the shared control of network management processes. Insight Research has published a Market Report on the subject entitled: Self Provisioning Enterprises and OSSes: Customer Network Management 2000-2005. Customer Network Management (CMN) is an approach to providing a customer with means to control, and monitor respective ports of a provider's network. Various aspects of CNM have been standardized by various standards bodies and, generally the architecture is defined by a hierarchy schematically illustrated in FIG. 1.

FIG. 1 is a schematic illustration of a hierarchical management network for management of a data transport network 12 in accordance with the prior art. The data transport network 12 includes a plurality of interconnected NEs 14. Each NE 14 is communicatively coupled with an element management system 16 (EMS) for managing (including provisioning, configuring, and reporting) the respective NE 14. The EMSs 16 collectively form an element management layer 18. It will be appreciated that the simple one-to-one relationship between the NEs 14 and EMSs does not hold in all data transport networks, however it is assumed for the sake of simplicity in the network shown in FIG. 1. A network management layer 20 for receiving management data from the element management layer 18 includes two network management systems (NMSs) 22 that provide network-wide control and monitoring. In other hierarchical management networks, higher layers (such as a services layer) may also be defined. The NMSs 22 provide reporting and analysis of statistics (usage, failure analysis, etc.) as is well known in the art, and can be used to dispatch crews to take preventative, corrective or emergency maintenance, etc. The NMSs 22 also permit an operator to provision, update and control of any of the NEs 14 from a centralized location.

It is known to provide clients with access to NMS 22 data using firewalls, encryption, and known Internet-based technologies. Nonetheless, controlling access to a significant volume of continuously updated information, based on different client access rights is a complex task, and requires significant processing capacity and communications equipment to meet timeliness requirements of clients, and to maintain effective control over the network by proprietary interests.

The complexity of data transport networks is also a significant hurdle when testing and verifying network elements. As is well understood by those skilled in the art, configurations of data transport networks need to be tested and verified at many levels, for various reasons, and typically require teams of test and verification specialists. Cabling of the interconnections, path verification, protection switching testing, routing algorithms, etc. all have to be maintained, tested, verified and updated. One of the problems with testing involves producing and differentiating consequences of simultaneous events at resources of different NEs. Typically the number of simultaneous events is minimized to limit the rapid increase in messaging in the element management layer and network management layer that follows multiple simultaneous events (autonomous notifications, traps, events, alarms, warnings etc.). Sorting through and sequencing the event results is a processing intensive task. On the other hand, serial testing is longer, incurs more equipment down time, and does not identify consequences of multiple concurrent failures. Typically, fewer than one alarm per NE is tested concurrently because of the message reporting solution deployed in hierarchical management networks.

There therefore remains a need for a method and apparatus for enabling efficient reporting of management data between layers of a hierarchical management network.

SUMMARY OF THE INVENTION

It is therefore an object of the invention to provide an apparatus for enabling efficient reporting of management data between layers of a hierarchical management network.

It is a further object of the invention to provide a method for enabling efficient reporting of management data between layers of a hierarchical management network.

In accordance with a first aspect, the invention therefore provides a mediator in a management communications stream established between a network element (NE) and network management systems (NMS). The mediator comprises a southbound interface for exchanging management data with the NE; a signal processor for processing the management data from the southbound interface to provide management data associated with a management representation of the NE, the management representation corresponding to a logical NE based on a predetermined proportion of resources of the NE; and, a northbound interface for exchanging management data associated with the management representation with the NMS.

In accordance with a further aspect of the invention, there is provided a mediator that processes at least two management communications streams established between a network element (NE) and respective network management systems. The mediator comprises a southbound interface for exchanging management data with the NE; a signal processor for processing the management data from the southbound interface to provide management data associated with respective ones of a plurality of management representations of the NE; and, a northbound interface for each of the network management systems, each northbound interface exchanging management data associated with one of the management representation, with a designated network management system.

In accordance with yet another aspect of the invention, there is provided a method for providing a plurality of management representations of a network element (NE). The method comprises steps of filtering and translating management data originating from the NE to provide management data to each of the management representations of the network element; and, for each of the management representations, establishing communications with a respective network or element management system to permit the exchange of the management data of a management corresponding representation.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method of partitioning resources within a network element (NE) and defining a management representation of the NE to be presented to one of a plurality of network management systems (NMSs). Each of the management representations is indistinguishable from a representation of a separate NE from a perspective of the NMS, and may be defined for client-service and testing reasons. Using client-based management representations, a client may access and control respective parts of the provider's NEs, and using testing-based representations, a number of simultaneous testing opportunities can be increased. The use of these management representations enables efficient reporting of management data between layers of a hierarchical management system.

Figure 1:
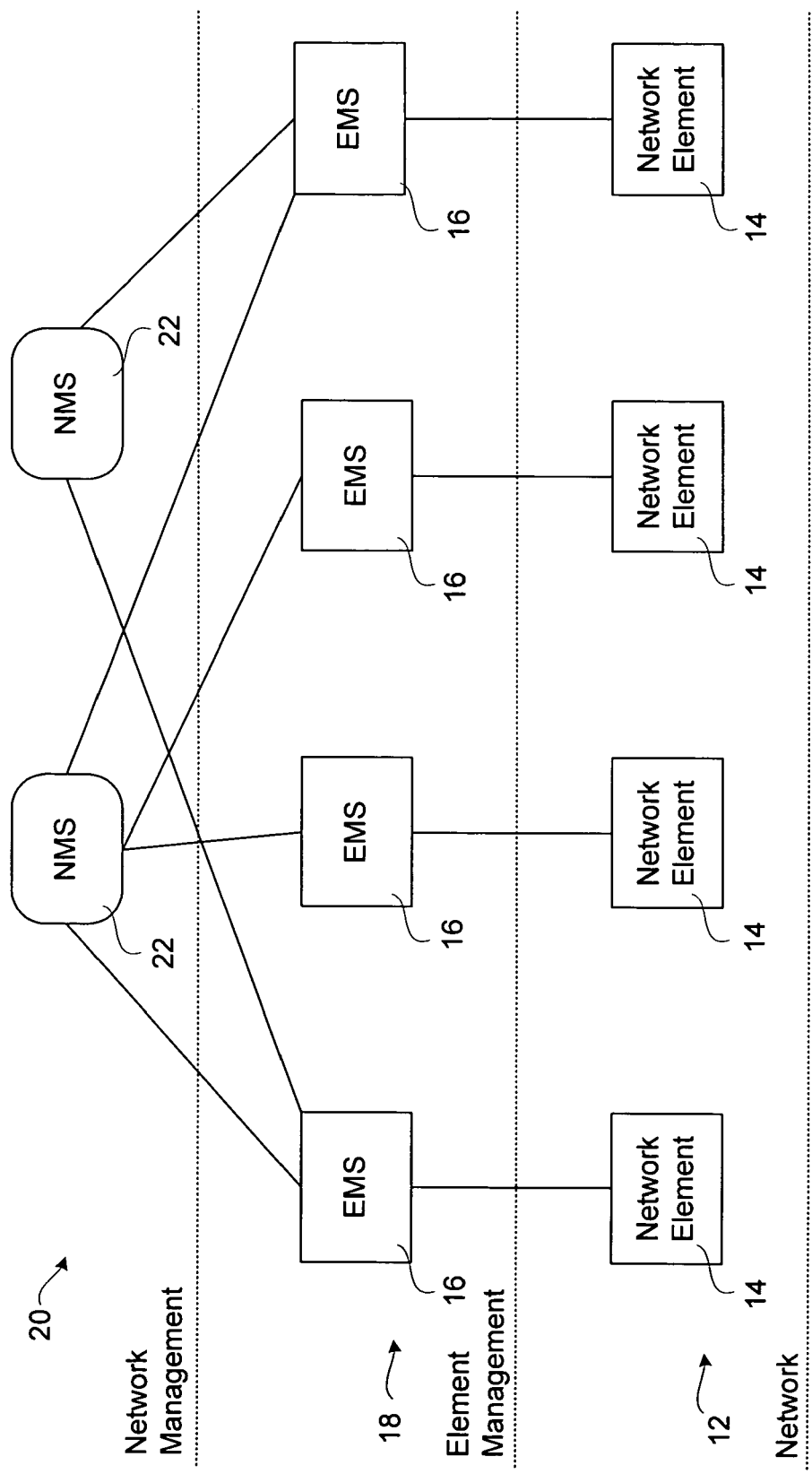
FIG. 1 is a schematic diagram illustrating a hierarchical management network for managing a data transport network in accordance with the prior art.
Figure 2:
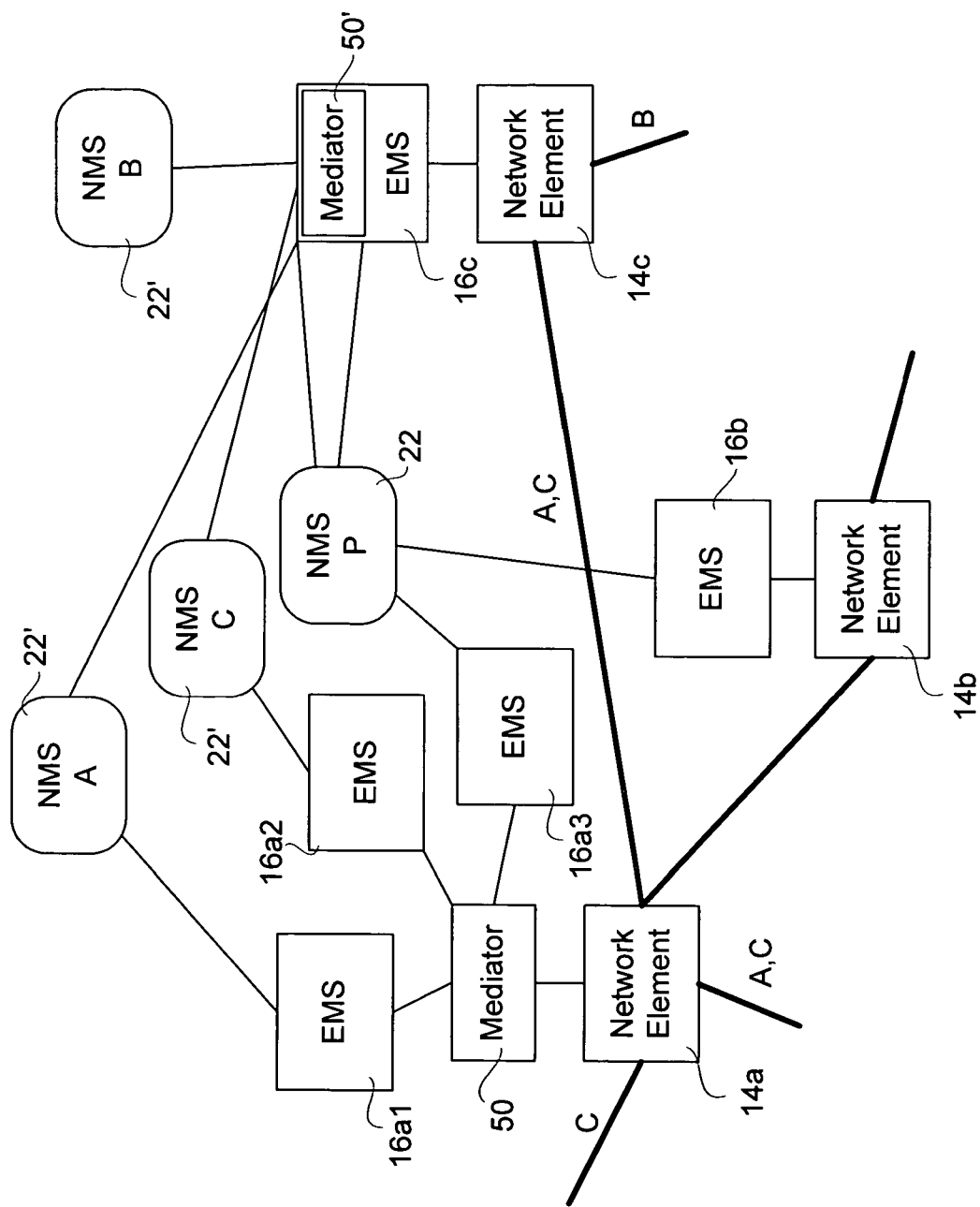
FIG. 2 is a schematic diagram illustrating a portion of a data transport network and a hierarchical management network including a mediator, in accordance with an embodiment of the invention.

FIG. 2 is a schematic illustration of a part of a network having three NEs 14a,b,c. Network communications media (such as optical fiber strands) interconnect NEs 14a, and b, and NEs 14a, and c, etc. The principal function of the NEs 14 is to cross-connect (switch or route) data between the various communications media. Network communications media are schematically represented by bold lines, whereas connections for management purposes are represented as lighter weight lines. It is well known in the art that a portion of bandwidth on network communications media may be used to convey management data and accordingly the management connections shown are more generally understood to be logical connections.

Each NE 14 has a network management interface that permits an EMS 16 to access a control interface of the NE 14, in a manner well known in the art. The network management interface may be associated with a logical port of the NE 14. As shown in FIG. 2, the network management interface of NE 14a is connected to a mediator 50.

The mediator 50 exchanges management data with NE 14a, and selectively forwards received management data to a plurality of EMSs 16a1, 16a2, and 16a3. Each of EMSS 16a1, 16a2, and 16a3 is associated with a respective management representation of the NE 14a. A management representation may be similar to a NE profile, commonly used in many management communications protocols to define resource capabilities, and other configuration information. Whereas EMS 16a3 receives all of the management data regarding NE 14a, the management representations of the NE 14a used by the EMSs 16a1, and 16a2, represent a respective subset of the resources in the NE 14a that happen to be relevant for a purpose for which the management representation is defined. For example, a management representation may be defined to provide a client with a consistent view of a subset of the resources available at the NE 14a. The mediator 50 resides between the network 12 and element management layer.

One convenient way of partitioning NE resources is at a level of granularity of a port. A port of a NE is an autonomous connection of a given bandwidth to another NE. The port may be divided into subports, and the resources of the NE may be partitioned by subport or at other convenient levels of granularity (cards, shelf, etc.).

Each of EMSs 16a may be a prior art EMS 16 that operates as if it is receiving management data from its respective NE, however the mediator 50 selectively sends the management data from NE 14a in accordance with a respective management representation, to present a consistent view of a corresponding logical NE that the EMS 16 manages, as is further explained below with reference to FIGS. 4a, 4b. The EMS 16a3 receives all of the management data from NE 14a. Likewise, EMS 16b, and EMS 16c receive all management data from NEs 14b, 14c respectively.

Each EMS 16 is connected to one or more NMSs 22 of the network management level. The illustrated embodiment shows four NMSs 22: NMSs A,B,C and P. NMS P is a provider NMS. NMS P has access to all management information related to each of the NEs 14a, 14b, 14c. In this way the provider can effect complete control over the NEs 14. Each of NMSs 22'A,22'B,22' C manages a respective, mutually exclusive set of resources of the NEs 14. More specifically, NMSs 22'A,22'C manage respective non-overlapping sets of resources of NE 14a; and NMSs 22'A,22'B,22'C manage respective non-overlapping sets of resources of NE 14c.

Resources of NE 14c are effectively partitioned by a mediator 50' that is embodied as program instructions running on the EMS 16c to which the NE 14c is connected. As such, the mediator 50' resides between the element management layer and the network management layer. The EMS 16c exchanges management data relating to the NE 14c with each of the NMSs 22. Specifically NMS P receives all management data relating to NE 14c, and NMS 22'A,22'B,22'C all receive management data related to respective mutually exclusive subsets of resources of NE 14c. One of the management representations (associated with NMS 22' (A) is also provided to the NMS 22P, permitting an operator at the NMS 22P to view the management data concurrently with a client, to facilitate assistance offered to the client by the provider operator.

It will be appreciated by those skilled in the art that the mediation device 50 can be embodied either as a networked device within a management communications stream between the network layer and the element management layer, or between the element management layer and the network management layer; or as software resident on a NE, or an EMS. An advantage of the mediator 50 as a networked device is that the mediator 50 can be deployed on any legacy equipment provided adequate knowledge of the protocol used for formatting the management data is available. This obviates the need to produce software that takes into account the processing environment, operating system, etc. of the NE/EMS. An advantage of a software implementation of the mediator is the reduction in communications hardware.

It will be appreciated that mediators can be designed to be used for any management communications protocol, including: Transaction Language 1 (TL1), Operations Support Services (OSS) protocols, and other implementations based on the Common Object Request Broker Architecture (CORBA), HyperText Transfer Protocol, telnet, and File Transfer Protocol (FTP), technologies, etc.

Figure 3:
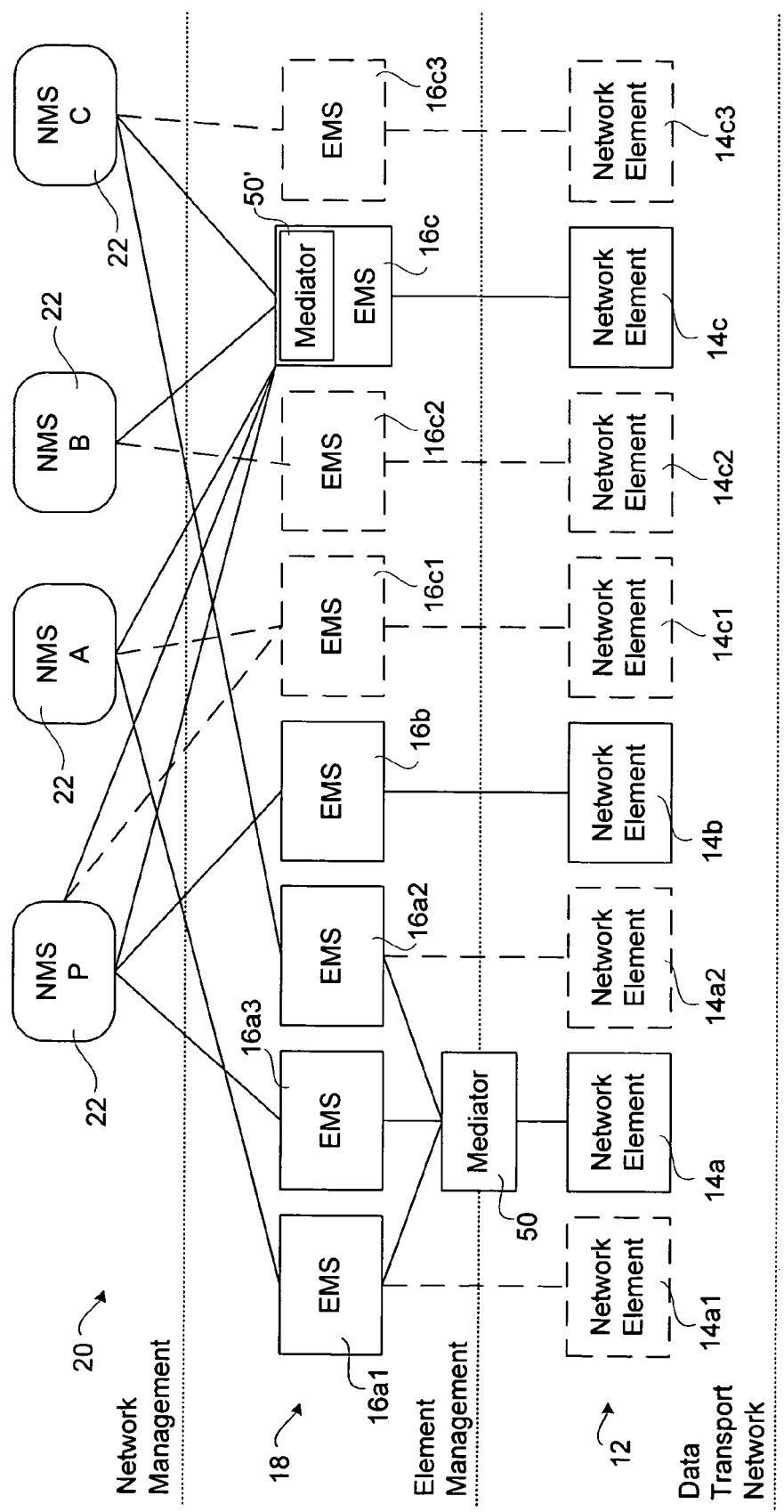
FIG. 3 is a schematic diagram illustrating the hierarchical management network of the data transport network shown in FIG. 2.

FIG. 3 provides a hierarchical view of the management network shown in FIG. 2. In general, blocks that are shown in dashed lines represent logical NEs 14 and logical EMSs 16 that are presented to one or more NMSs 22, but are not associated with separate physical NEs 14 or EMSs 16.

Three NEs 14a, 14b, 14c of the data transport network 12 are physical NEs. Mediator 50 connected to NE 14a provides all management data to EMS 16a3, which in turn reports the data to NMS 22P; NE 14b provides all management data to EMS 16b, which forwards the data to NMS 22P; and EMS 16c, with resident mediator 50', receives all management data from NE 14c and forwards it to NMS 22P; therefore NMS 22P has complete access to the management data of the three physical NEs 14. The EMSs 16a1, 16a2 receive management data according to respective management representations of the NE 14a and manage respective logical NEs 14a1,14a2. EMS 16a1, 16a2 report to NMSs 22'A,22'C, respectively.

The EMS 16c executes program code to invoke the mediator 50', which generates three management representations, and reports relevant management data to each of respective ones of the NMSs 22'A,22'B,22'C. Specifically, the NMS 22A receives management data corresponding to a (logical) NE 14c1 from the EMS 16c1, which is logically distinct from EMS 16c, and so is represented as a logical EMS (in dashed lines). Similarly, NMSs 22'B,22'C receive corresponding management data streams as if from logical NEs 14c2,14c3 via logical EMSs 16c2,16c3, respectively. The NMS 22P also receives the management data from EMS 16c 1, as schematically illustrated. As previously stated, the NMS 22P operator may prefer to view management data of a particular logical NE rather than the entire NE to facilitate consultation with an operator of a client NMS, for example. It may therefore be desirable to configure the EMSs 16 to relay selected logical management data streams upon request from the NMS 22P.

Figure 4A:
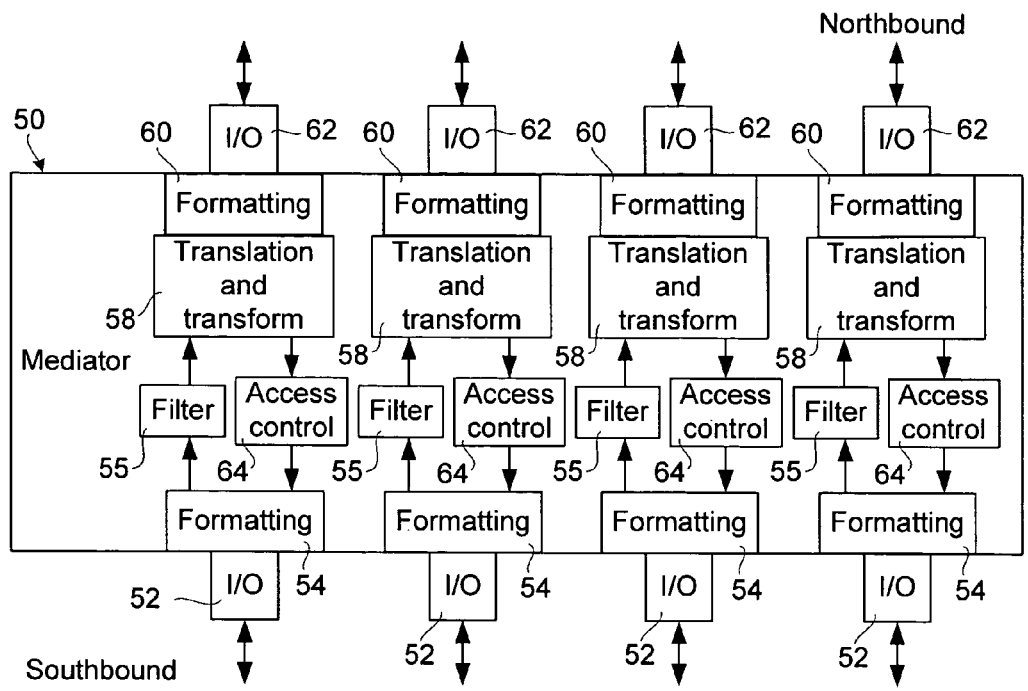
FIGS. 4a,b are schematic diagrams illustrating principal functional components of two embodiments of a mediator in accordance with the invention.

FIG. 4a schematically illustrates principal functional components of one embodiment of a mediator 50, having a plurality of northbound and southbound interfaces. Each southbound interface is a logical (if not physical) input/output (I/O) port 52 with formatting modules 54. The southbound ports 52 exchange management data with a designated EMS. Management data moved in the northbound direction is received in a prescribed format from the EMS at the southbound ports 52.

When management data is retrieved from a southbound interface, a filter 55 is applied to the data. Each respective southbound interface applies a specific filter that, in the illustrated embodiment is based on the resources of the NE to which the management data relates. Accordingly the NE's resources are partitioned so that any port of the NE is associated with at most one management representation of the NE. Consequently, management data associated only a proportion of the resources of the NE determined by the management representation is passed through the filter. The filter 55 discards all management data that is not associated with the management representation.

Management data that is associated with the resources of the logical NE is forwarded to a translation and transformation module 58. As will be appreciated by those skilled in the art, any difference between the management representations of the NE and the configuration of the NE itself (upon which the management data is based) potentially leads to a disjunct in a form and content of management data expected by the EMS/NMS northbound of the mediator 50. In accordance with one embodiment, the logical NEs are of a same configuration and profile as the physical NE upon which it is based, and all ports not managed by the user are represented as "out of service". While this solution has certain advantages for simplifying the client NMS interface, and for permitting a vendor-agnostic mediator, in other embodiments the management representation may be modified to simplify access control and to minimize translation and transformation requirements. A few examples illustrative of translation and transformation operations, are presented below.

If a service provider wishes to present a user-assigned port of a NE to the user NMS as if it were a first port of the NE, or to list the user-assigned ports as if they were consecutive, regardless of whether the ports are contiguous, the order of the port numbers in the management data received from the NE may be mapped to the consecutive port numbers presented to the user's NMS. Re-mapping the port numbers may cause card-level or a shelf-level management data to be mismatched with card-level or shelf-level events of the logical NE. It may therefore be preferable to translate all events into port-level messages. Alternatively, management representations may be constrained to preserve card and shelf membership relations.

For any aggregate statistics associated with a card/shelf/NE where the card/shelf/NE includes resources not assigned to the user, the statistics may have to be renormalized or recomputed using port-level statistics, so that the user is only presented statistics relevant to the proportion of the NE's resources assigned to the user. The translation and transformation module 58 is responsible for translating equipment identifiers of the NE/shelf/card, to the equipment identifiers used to define the logical NE(s), and vice versa.

After the management data has been translated and transformed by the translation and transform module 58, it is forwarded via a northbound interface to a corresponding NMS, optionally Via a northbound EMS. As will be understood by those skilled in the art, the management data is formatted by formatting modules 60 and transmitted over a respective northbound port 62 in accordance with a communications protocol (which may or may not be the same as that used by other northbound or southbound interfaces, provided respective transmission facilities are available). It will further be understood that each of the ports 52,62 is associated with a respective network address so that the mediator 50 serves as a proxy to a corresponding logical NE.

In the southbound direction, a packet containing management data received from the NMS is received at the northbound port 62 and formatted by formatting module 60. The management data content of the packet is translated and transformed by applying inverse operations to bring the management data into a form consistent with the management data of the NE proper by the translation and transformation operator 58.

The management data is subsequently passed to an access control module 64, which enforces any predetermined restrictions on the user NMS's access to control the NE. More specifically, if the user NMS issues a command (for example) that might impact resources of the NE aside from those resources assigned to the user, the access control module 64 may discard the management data, may modify command parameters to limit the affects of the management data to the assigned resources, and/or may reply to the command, via the northbound interface, indicating that the target resources are out of service, the command is not authorized or not recognized, or that the management data was rejected. The filter 55 and access control module 64 therefore restrict user NMS control of the NE.

In accordance with other embodiments of the invention, the access control module 64 may further be adapted to compare management data received from the provider NMS with that received from the respective user NMSs to avoid conflicting management data from being sent to the NE, or otherwise resolve management contention issues.

The management data is forwarded to the corresponding southbound interface (formatting module 54, and port 52) and is transmitted to the southbound EMS/NE.

Figure 4B:
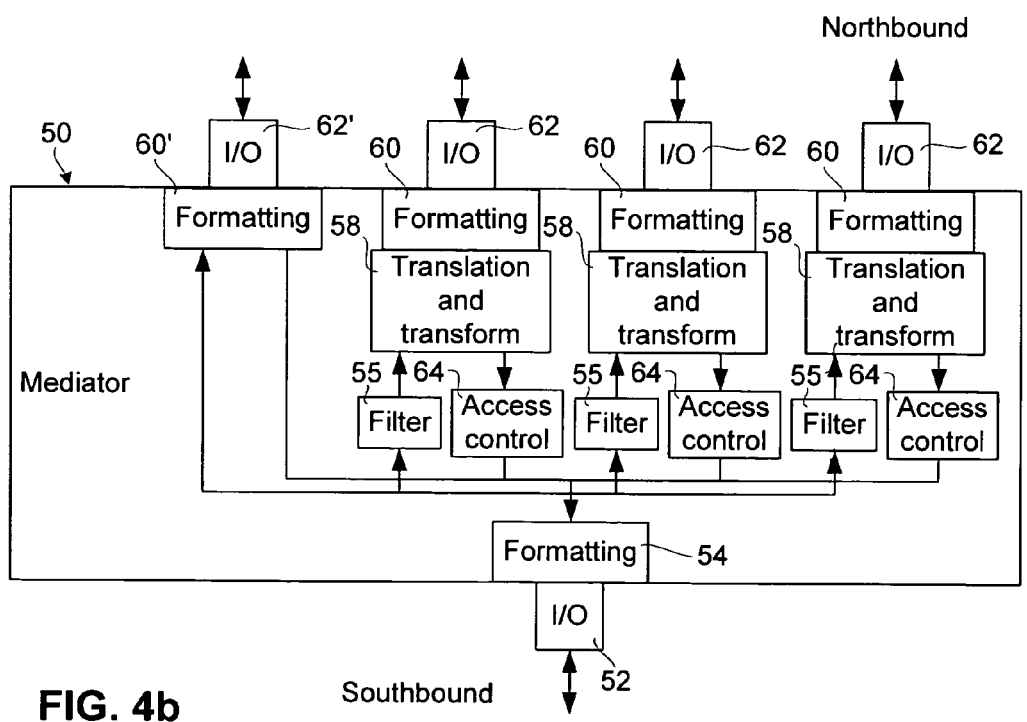

As shown in FIG. 4*b*, a variant of the mediator 50 shown in FIG. 4*a* has only one southbound interface. In this configuration, queuing of management data may be performed prior to transmission over the southbound interface, and the management data received at the southbound interface is presented to each of the filters 55, in a manner well known in the art. In the embodiment shown in FIG. 4*b*, the mediator 50 further includes a northbound interface (port 62', and formatting module 60') that relays the management data (unfiltered, and unmodified) between the NE and an NMS (such as a service provider NMS). The embodiment shown in FIG. 4*a* does not include such a northbound interface. In some embodiments it may not be desirable to provide all management data to any one northbound EMS/NMS, in order, to prevent any conflicting management actions from affecting operation of the NE. Alternatively, the mediator 50 as shown in FIG. 4*a* may be invoked to mediate management actions passed to the southbound NE/EMS if one of the northbound interfaces sends all management data to an NMS.

Figure 5:
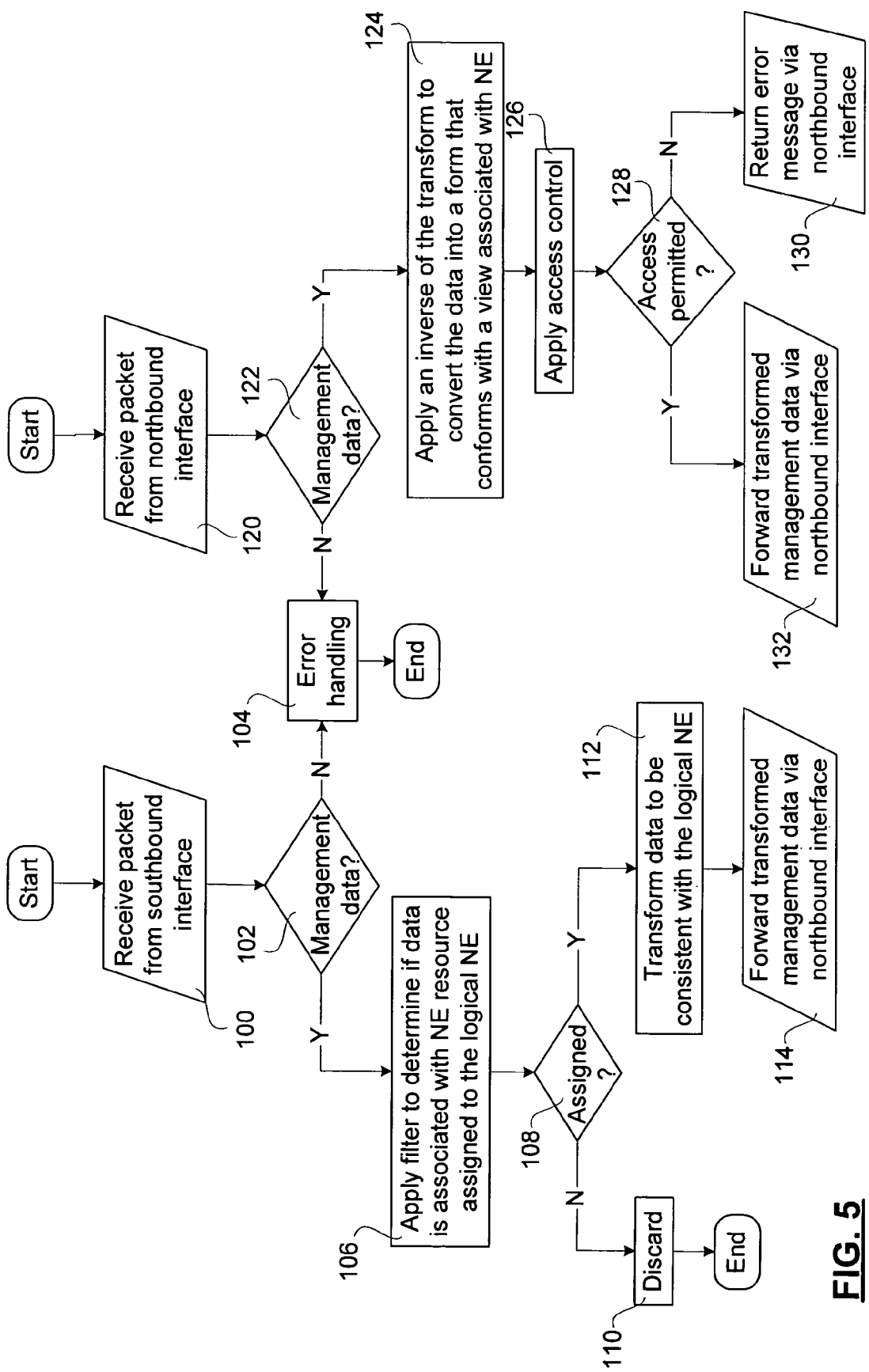
FIG. 5 is a flow chart illustrating principal steps performed by the mediator in the processing of management data, in accordance with an embodiment of the invention.

FIG. 5 is a flow chart illustrating principal steps applied by a mediator 50 in respect of a message received at a northbound or a southbound interface for a particular logical NE, in accordance with one embodiment of the invention.

In step 100, a packet is received from a southbound interface. The packet is inspected to verify that it conforms to an expected protocol and contains management data (step 102). If the packet does not conform to the expected protocol, error handling procedures are invoked (step 104) and the processing of the packet terminates.

Otherwise the contents of the packet is inspected, and a filter is applied (step 106). The filter determines the resources of the NE referenced by the packet content, and compares those resources with a list of the resources associated with a management representation that defines the logical NE. If the data is not associated with a NE resource included in the management representation of the logical NE (step 108), the management data is discarded (step 110), and the processing of the management data ends. Otherwise, the management data is transformed to produce management data that is consistent with the management representation of the logical NE (step 112).

In step 114, the modified management data is forwarded via the corresponding northbound interface to either a NMS or a northbound EMS, and the processing of the packet is complete.

In step 120 a packet is received at the northbound interface. The packet is inspected, and it is determined whether it contains management data (step 122). Error handling is applied (step 104) if it dos not. The management data is then subjected to an inverse of the transform to convert the management data into a form that is consistent with the management view of the logical NE (step 124). Subsequently, the modified management data is inspected to determine whether the client NMS that issued the management data has been granted access to control the resources that will be affected by the management data (step 126).

If it is determined in step 128 that access is not permitted, in step 130 the processing of the packet ends and an error message is returned via the northbound interface. The error message indicates that the management action was rejected. For example, if the NMS operator interface presents the logical NE as having all of the resources of the physical NE, and all ports not assigned to the user are represented as out of service, the error message may assert that the management action cannot be effected because one or more ports identified are not in service.

If access is determined to be permitted (step 128), the modified management data is forwarded toward the NE via the southbound interface (step 132), ending the processing of the packet.

Figure 6:
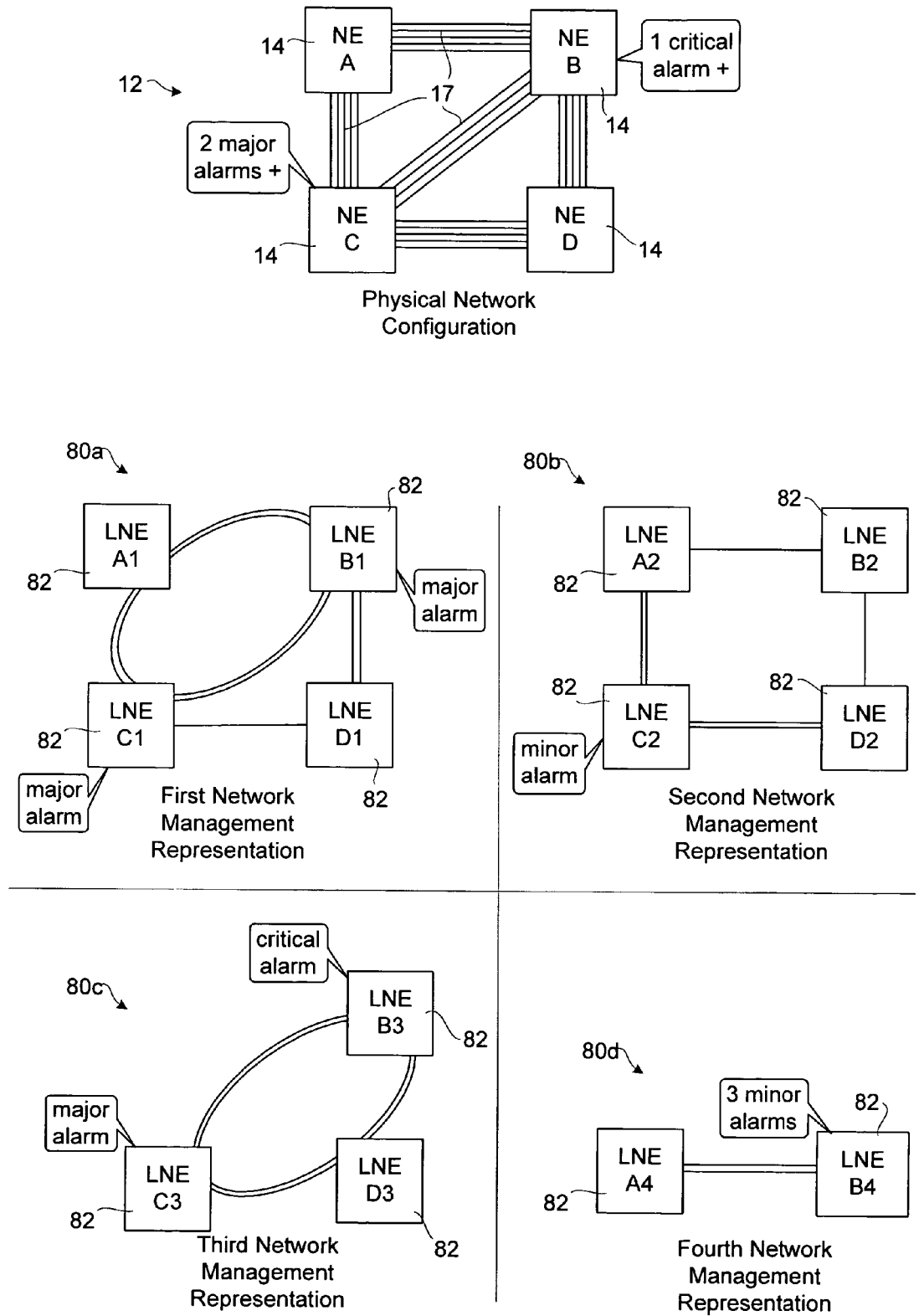
FIG. 6 is a schematic diagram of a small data transport network, and four management representations thereof useful for providing multiple simultaneous testing opportunities, in accordance with an embodiment of the invention.

FIG. 6 is a schematic diagram of a data transport network 12, and four different network management representations 80 of the network 12. As noted above, one of the reasons for creating management representations of NEs 14 is to facilitate test and verification procedures. By partitioning the network into connected collections of logical NEs (i.e. a network management representation), an NMS operator interface presenting the network management representation receives only all management data related to logical network elements (LNEs) 82 of interest, which simplifies test and verification procedures, makes the operator interface less complex, and permits other test and verification specialists to perform simultaneous testing of other resources of the same NEs using another network management representation 80. In this manner test and verification of a great number of combinations of events can be performed concurrently by different teams, resulting in a fully verified hardware or software product, configuration, etc. with significantly shorter NE down time.

The physical network configuration consists of four NEs 14 (NEs A,B,C,D) interconnected by optical fiber links 17 supporting 7 Bidirectional Line Switched Rings (BLSR) as follows: 3 BLSRs A,B,D,C, (not shown), 2 BLSRs A,B,C, (not shown), and 2 BLSRs B,C,D (not shown). At a snapshot in time NE B is reporting 1 critical alarm, and other lower level conditions (alarms and warnings), and NE C is reporting 2 major alarms and other lower level conditions. A hierarchy of conditions (critical>major>minor>warning) adopted from the TL1 protocol, is used to demonstrate how a higher number of simultaneous test opportunities are facilitated using network partitioning.

A first network management representation 80*a* provides a mixed network having two BLSRs A1,B1,C1 (not shown); a protected (1+1) link between LNEs B1 and D1; and an unprotected link between LNEs C1 and D1. LNE A1 is also shown. LNEs B1 and C1 are both in a condition of a major alarm. It is relatively easy for test and verification specialists to identify the cause of the alarm because only a fraction of the resources at NEs B,C are included in LNEs B1 and C1, shortening the search space, and because the major alarms are caused by the actions of the test and verification specialists, and are not mixed with actions taken by other test and verification specialists working on the other network management representations.

The second network management representation 80b is of an unprotected mesh configuration. There are two links between LNEs A2, and C2, and between LNEs C2, and D2, and one link between LNEs A2, and B2, and LNEs B2, and D2. A minor alarm that does not receive mention at the NE C level, because it is superceded by two major alarms. The minor alarm is presented to the test and verification specialists, facilitating the identification of the minor alarm.

The third network management representation 80c includes a pair of BLSRs B3,C3,D3 (not shown). The LNE C3 is in a major alarm condition, and the LNE B3 is in a critical alarm condition. LNE D3 is not currently in alarm condition.

The fourth network management representation 80d of the physical network is a linear, protected pair of links between LNEs A4, and B4. Three minor alarms not evident at the NE level of NE B are present.

A mediator and method have therefore been described that permits efficient reporting of information in a hierarchical management network for managing a data transport network. The mediator partitions resources of the NEs of the data transport network and selectively forwards management data associated with respective partitions to a corresponding northbound EMSs or NMSs (depending on whether the mediator mediates between a network level and an element management level, or between the element management level and a network management level). The mediator further modifies the management data so that the northbound EMS or NMS receives the management data in a view consistent with a respective management representation of the NE. Client-based management representations may be created to permit clients to manage respective selected resources of the NE, and testing-base management representations may be created to facilitate concurrent testing of an NE.

The embodiments of the invention described above are intended to be exemplary only. The scope of the invention is therefore intended to be limited solely by the scope of the appended claims.

We claim:

1. A mediator device in a management communications stream established between a network element (NE) and network management systems (NMS), the mediator comprising:
   a southbound interface for exchanging management data with the NE;
   a signal processor for processing the management data from the southbound interface to provide management data associated with a management representation of the NE, the management representation corresponding to a logical NE based on a predetermined proportion of resources of the NE; and
   a northbound interface for exchanging management data associated with the management representation with the NMS;
   wherein the signal processor comprises a filter for the northbound interface, the filter inspecting individual packet content and discarding from individual packets management data received from the southbound interface that is not associated with the management representation of the logical network element, and
   wherein the filter is associated with a respective mutually exclusive set of the predetermined proportion of resources of the NE, and only admits management data associated with that predetermined set of resources.

2. A mediator device that processes at least two management communications streams established between a network element (NE) and respective network management systems, the mediator comprising:
   a southbound interface for exchanging management data with the NE;
   a signal processor for processing the management data from the southbound interface to provide management data associated with respective ones of a plurality of management representations of the NE; and
   a northbound interface for each of the network management systems, each northbound interface exchanging management data associated with one of the management representation, with a designated network management system;
   wherein the signal processor comprises a filter for each of the northbound interfaces, each filter inspecting individual packet content and discarding from individual packets management data received from the southbound interface that is not associated with the respective management representation, and
   wherein each of the filters is associated with a respective mutually exclusive set of resources of the NE, and only admits management data associated with that set of resources.

3. The mediator device as claimed in claim 2 wherein the signal processor further comprises:
   a module for translating and transforming the management data for each of the northbound interfaces, the module presenting a consistent view of the management representation expected by each network management system.

4. The mediator device as claimed in claim 3 wherein the module is adapted to substitute an equipment identifier used by the NE with an equipment identifier used by the management representation.

5. The mediator device as claimed in claim 3 wherein each of the northbound and southbound interfaces is associated with a respective logical port, and the mediator serves as a proxy for management data.

6. The mediator device as claimed in claim 2 wherein each set of resources is associated with a group of ports of the NE.

7. The mediator device as claimed in claim 2 further comprising an access control module for selectively permitting the respective network management systems to control a predetermined proportion of resources of the NE.

8. The mediator device as claimed in claim 2 wherein the mediator is a communications device connected to the NE by the southbound interface, and connected to a plurality of element management systems by respective northbound interfaces, the element management systems being connected to the corresponding network management systems.

9. The mediator device as claimed in claim 2 wherein the mediator is a communications device connected to an element management system by the southbound interface, the element management system being connected to the NE.

10. The mediator device as claimed in claim 2 further comprising a northbound interface that exchanges all management data associated with the NE with a network management system.

11. A method for providing a plurality of management representations of a network element (NE), the method comprising:

filtering and translating management data originating from the NE to provide management data to each of the management representations of the network element, the filtering being associated with a respective mutually exclusive set of resources of the NE for each management representation and only admitting management data to each management representation associated with that set of resources; and for each of the management representations, establishing communications with a respective network or element management system to permit the exchange of the management data of a management corresponding representation;

wherein filtering and translating comprises inspecting individual packet content and filtering the management data received from the NE to provide a filtered management data stream to each of the management representations, the filtering discarding management data from individual packets that is not associated with each respective management representation.

12. The method as claimed in claim 11 further comprising an initial step of establishing a network connection to the NE.

13. The method as claimed in claim 11 further comprising an initial step of establishing a network connection to an element management system of the NE.

14. The method as claimed in claim 11 wherein filtering and translating further comprises:
translating and transforming each filtered management data stream to provide management data to the element or network management system that is consistent with each management representation.

15. The method as claimed in claim 14 wherein translating and transforming comprises substituting an equipment identifier used by the NE with an equipment identifier used by the management representation.

16. The method as claimed in claim 11 further comprising:
determining if an element or network management system sending management data is authorized to control NE resources targeted by the management data; and
forwarding the management data to the NE only if it is determined that the element or network management system is authorized to control the NE resources.

17. The method as claimed in claim 16 further comprising returning an error message to the element or network management system that sent the management data if it is found that the element or network management system is not authorized to control the NE resources.

18. The method as claimed in claim 11 further comprising creating at least two testing-based management representations of the NE to facilitate concurrent testing of the NE.

* * * * *